United States Patent [19]
Pipes

[11] 3,765,393
[45] Oct. 16, 1973

[54] LUBRICATION OF TWO-CYCLE ENGINE GEARBOX

[75] Inventor: Wesley C. Pipes, Galesburg, Ill.

[73] Assignee: Outboard Marine Corporation, Waukegan, Ill.

[22] Filed: June 22, 1972

[21] Appl. No.: 265,345

[52] U.S. Cl. .................................. 123/196 CP
[51] Int. Cl. ........................................ F01m 3/00
[58] Field of Search ............... 123/196 CP, 73 AD; 184/6.5

[56] References Cited
UNITED STATES PATENTS

| | | | |
|---|---|---|---|
| 3,542,154 | 11/1970 | Morner et al. | 123/196 CP |
| 2,857,903 | 10/1958 | Watkins | 123/196 CP |
| 2,443,957 | 6/1948 | Herrington | 123/196 CP |
| 2,111,242 | 3/1938 | Harley | 123/196 CP X |

*Primary Examiner*—Manuel A. Antonakas
*Attorney*—Robert E. Clemency et al.

[57] ABSTRACT

A two-cycle engine includes a valve means which periodically communicates with a crankcase sump collecting lubricating oil from the combustion mixture and a gearbox only during a period of positive pressure in the crankcase so that the oil is pumped from the crankcase into the gearbox to lubricate the gears therein.

9 Claims, 3 Drawing Figures

PATENTED OCT 16 1973  3,765,393

3,765,393

LUBRICATION OF TWO-CYCLE ENGINE GEARBOX

BACKGROUND OF THE INVENTION

This invention relates to two-cycle engines. More particularly, this invention relates to a system for lubricating auxiliary power take-off gears of two-cycle engines.

The crankshaft of a two-cycle engine is quite commonly used to drive a power take-off shaft which, in turn, is used for various purposes. A typical application for such a power take-off shaft is to drive the wheels of a self-propelled lawnmower. Meshing gears on the crankshaft and power take-off shaft should be lubricated to minimize wear. In order to obtain the most effective lubrication, it is desirable to continuously circulate fresh lubricating oil to these gears during operation of the engine.

SUMMARY OF THE INVENTION

This invention provides an arrangement for lubricating the power take-off gears of a two-cycle engine. In accordance with the invention, a valve means is provided for periodically communicating with a crankcase sump collecting oil separatiang from the combustion mixture and a gearbox housing the gears only during a period of positive crankcase pressure so that oil flows from the sump into the gearbox to lubricate the gears. In accordance with a preferred embodiment, the valve means is an elongated, axial groove which is formed in the crankshaft, which extends into the gearbox and which periodically communicates with the sump during rotation of the crankshaft. Also, in accordance with the invention, the oil is returned to the engine at a point upstream of the valve member of the engine reed valve assembly through a return flow passage means so that oil is circulated through the gearbox during engine operation. Preferably, the outlet of the return flow passage means is located immediately upstream of the reed valve member so as to expose the return flow passage to the reduced pressure occurring during travel of the piston to the top dead center position, thereby assisting the withdrawal of the oil from the gearbox. The inlet of the return flow passage means is preferably located above the bottom of the gearbox so that a predetermined level of oil is maintained in the gearbox.

The primary object of this invention is to provide an arrangement for providing lubrication to the gearbox of a two-cycle engine.

Another object of this invention is to provide such an arrangement which is capable of circulating lubricating oil through the gearbox.

Other objects and advantages of this invention will become apparent to those skilled in the art from the following detailed description, drawing and appended claims.

DESCRIPTION OF THE PREFERRED EMBODIMENTS

Figure 1:
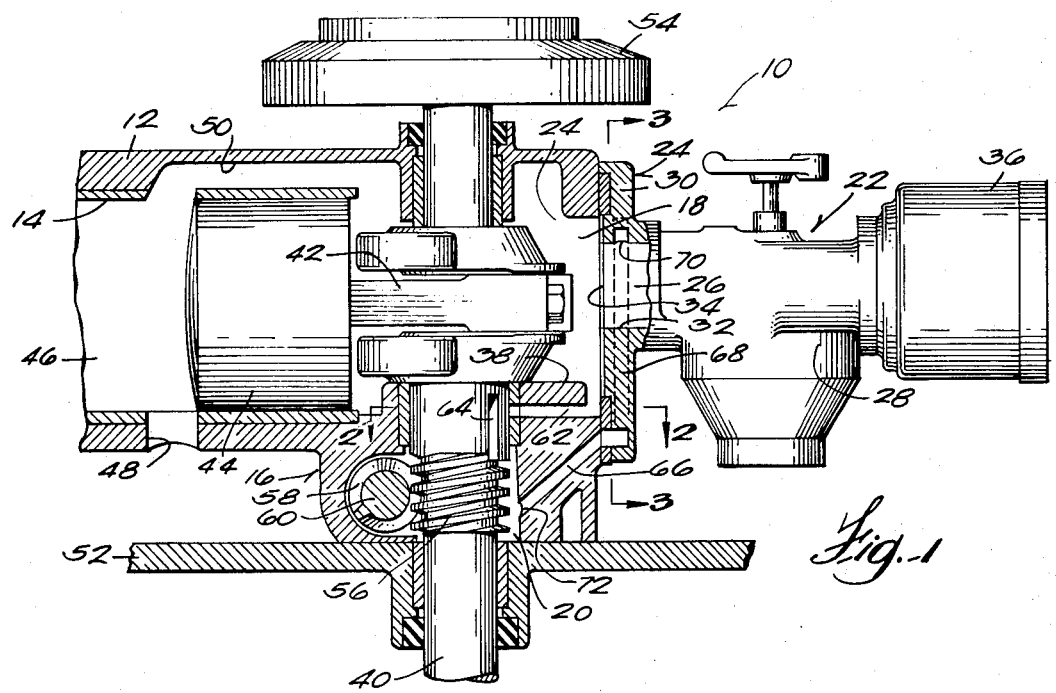
FIG. 1 is a fragmentary, partially sectioned, side view of the two-cycle engine of this invention shown installed on a fragmentarily illustrated lawnmower.

Referring to FIG. 1, engine 10 which is a crankcase scavenging type, two-cycle engine, includes an engine block 12 defining a cylinder 14, a crankcase assembly 16 defining a crankcase 18 and a gearbox 20, and an intake assembly 22 including a reed valve assembly 24 and an intake manifold 26, and a carburetor 28. The cylinder 14 is conventionally arranged with a head (not shown) in which a spark plug (not shown) is mounted. Reed valve assembly 24 has a plate 30, an inlet port 32 and a movable valve member 34. The cylinder 14 is periodically communicable with the crankcase 18 which is otherwise closed or gas tight, except for the reed valve member 34 which admits a combustion mixture of air, fuel and lubricating oil from the carburetor 28 through the inlet port 32. Air is supplied to the carburetor 28 through an air filter 36. The reed valve member 34, which is of conventional design, permits fluid flow into the crankcase 18 through the inlet port 32, when the internal pressure therein is less than the exterior pressure, and prevents back flow of fluid through the inlet port 32, when the internal pressure in the crankcase is greater than the exterior pressure. Lubricating oil separating from the combustion mixture is collected in a sump 38 located in the bottom of the crankcase 18.

A crankshaft 40 extends vertically through the crankcase 18 and is suitably journaled in the crankcase assembly 16. A piston rod 42 is pivotally connected at one end to the crankshaft 40 and is pivotally connected at the other end to a piston 44. The piston 44 reciprocates axially within the cylinder 14 between bottom dead center and top dead center positions, and together with the cylinder 14, defines a variable volume combustion chamber 46. As is usual in two-cycle engines, cylinder 14 includes at least one exhaust port 48 (which is open to atmosphere) and at least one transfer or bypass passage 50, which communicates between the combustion chamber 46 and the crankcase 18. During normal engine operation, the combustion mixture is supplied to the combustion chamber from the crankcase through the passage 50 and burnt gases are exhausted from the combustion chamber through the exhaust port 48, when the piston is at or adjacent to a bottom dead center position, such as that shown in FIG. 1.

As shown in FIG. 1, engine 10 is mounted on a fragmentarily illustrated self-propelled lawnmower 52 with a magneto/fly wheel assembly 54 mounted on the upper end of the crankshaft 40 and a rotary cutting blade (not shown) mounted on the lower end of the crankshaft 40. The crankshaft 40 includes a power take-off worm gear 56 which is positioned within the gearcase 20. The worm gear 56 meshes with a complementary gear 58 on a power take-off shaft 60, which extends transversely through and is suitably journaled in the crankcase assembly 16. The power take-off shaft 60 is operably connected to the wheels of the lawnmower 52, via a suitable clutch arrangement, to propel the lawnmower.

Figure 2:
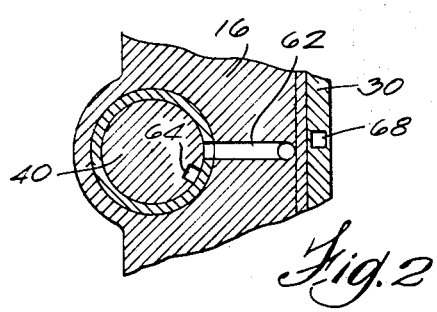
FIG. 2 is a fragmentary, sectional view taken along the plane designated 2—2 in FIG. 1.

In accordance with the invention valve means are provided for periodically communicating the sump 38 with the gearcase 20 only during a period of positive pressure in the crankcase so that lubricating oil flows from the sump into the gearcase. While various valve constructions can be employed, it is preferred to provide the crankcase assembly 16 with an oil supply passage 62 communicating with the sump 38 and to provide the crankshaft 40 with an elongated groove 64 which extends into the gearbox 20 and periodically communicates with the oil supply passage 62 as the crankshaft rotates during normal engine operation. The groove 64 is located on the crankshaft 40 so as to communicate with the oil supply passage 62 only when the piston 44 is at or adjacent to the bottom dead center position. As shown in FIGS. 1 and 2, the piston is at a position slightly past bottom dead center position. Thus, the groove 64 acts as a valve admitting oil from the sump 38 into the gearbox 20 to lubricate the gears 56 and 58, via the supply passage 62, only when the crankcase 18 is under positive pressure, i.e. the oil is pumped from the sump into the gearbox.

The oil can be returned from the gearbox 20 to the engine at some point upstream of the reed valve member through a return flow passage means. With this arrangement, a continuous flow of oil is circulated through the gearbox during engine operation. It is preferred to return the oil to the intake assembly where it can be fed into and mixed with the incoming stream of combustion mixture.

Figure 3:
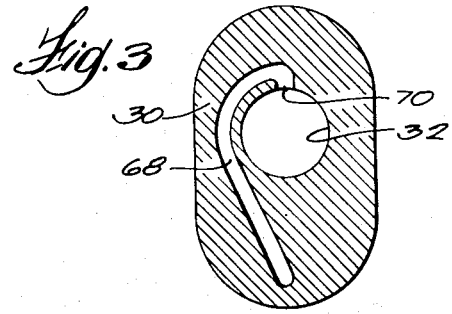
FIG. 3 is a sectional view taken along the plane designated 3—3 in FIG. 1.

As shown in FIGS. 1 and 3, the return passage means can comprise internal passages 66 and 68 provided in the crankcase assembly 16 and the reed valve plate 30, respectively. The passage 68 includes an outlet 70 which is located at the top portion of the intake manifold 26 so that the returning oil drops downwardly into the incoming stream of combustion mixture. The return passage 66 includes an inlet 72 which is preferably located above the bottom of gearcase 20 so that a reservoir of oil, the level of which is sufficient to provide the desired lubrication of gears 56 and 58, is maintained within the gearbox at all times. Alternatively, the return passage means can include an external conduit means communicating between an internal passage in the crankcase assembly leading to the gearcase and the upstream side of the reed valve member.

Preferably, the outlet 70 of the return flow passage means is located immediately upstream of reed valve member 34 so that the flow passage is exposed to the reduced pressure in the intake manifold 26 as the piston moves towards the top dead center position. This reduced pressure tends to assist in the withdrawl of oil from the gearcase 20 above the level of the inlet 72. The valving action provided by the crankshaft groove 64 isolates the gearcase from the crankcase so that oil is not withdrawn through the supply passage 62 during this stroke. In accordance with the preferred embodiment mentioned above, the return passage 66 can be arranged at an angle, as shown in FIG. 1, or can be substantially horizontal, so long as the inlet 72 is located to provide the desired level of oil in the gearcase.

From the above detailed description, it can be seen that this invention provides a lubrication system which is capable of maintaining positive lubrication of and continuously circulating fresh lubricant to the power take-off gears of a two-stroke engine. Lubrication is provided by oil from the incoming combustion mixture which is pumped into the gear box to lubricate the gears. A preferred embodiment provides circulation of the oil through the gearbox by the cooperation of a novel arrangement of the crankshaft and supply and return passages communicating between the crankcase, the gearcase and the upstream side of the reed valve member.

As will readily be apparent to those skilled in the art, various alterations and modifications can be made to the preferred embodiment described without departing from the spirit and scope of the invention.

I claim:

1. A two-cycle engine comprising an engine block including a cylinder
   a crankcase assembly including a crankcase, periodically communicable with said cylinder, and a gearcase,
   a crankshaft journaled in said crankcase assembly and extending through said crankcase and said gearcase, said crankshaft having a first gear means positioned in said gearbox;
   an output shaft journaled in said crankcase assembly and extending through said gear case, said output shaft having a second gear means positioned in said gearcase and meshing with said first gear means,
   a piston pivotally connected to said crankshaft and reciprocably movable axially within said cylinder between top dead center and bottom dead center positions to periodically pressurize said gearcase,
   an intake assembly connected to said crankcase for introducing thereinto a combustion mixture including lubricating oil, said intake assembly including an inlet port and a valve member movable relative to said inlet port for admitting the combustion mixture into said crankcase when the pressure in said crankcase is less than the exterior pressure and for preventing back flow of fluid through said inlet port when the pressure in said crankcase is greater than the exterior pressure,
   a sump in the bottom portion of said crankcase for collecting lubricating oil separating from said combustion mixture and
   valve means periodically communicating said sump with said gearcase only during a period of positive pressure in said crankcase so that the lubricating oil flows from said sump into said gearcase.

2. An engine according to claim 1 including return flow passage means communicating with said gearcase and said intake assembly at a point upstream of said valve member for returning oil from said gearcase to said intake assembly.

3. An engine according to claim 2 wherein said return flow passage means includes an inlet positioned above the bottom of said gearcase so that a predetermined level of lubricating oil is maintained in said gearcase.

4. An engine according to claim 1 wherein said valve means is an elongated, axial groove which is formed in said crankshaft, which extends into said gearbox and which periodically communicates with said sump during rotation of said crankshaft.

5. An engine according to claim 2 wherein said return flow passage means includes an outlet located in the top portion of said intake assembly so that the returning lubricating oil flows downwardly into the incoming stream of combustion mixture.

6. An engine according to claim 2 wherein said return passage means includes an outlet located immediately upstream of said valve member so as to expose said return flow passage means to the reduced pressure occuring during travel of said piston toward the top dead center position.

7. A two-cycle engine comprising
an engine block including a cylinder,
a crankcase assembly including a crankcase, periodically communicable with said cylinder, and gearcase,
a crankshaft journaled in said crankcase assembly and extending through said crankcase and said gearbox, said crankcase having a first gear means positioned in said gearbox,
an output shaft journaled in said crankcase assembly and extending through said gearbox, said output shaft having a second gear means positioned in said gearcase and meshing with said first gear means,
a piston pivotally connected to said crankshaft and reciprocably movable axially within said cylinder between top dead center and bottom dead center positions to periodically pressurize said crankcase,
an intake assembly connected to said crankcase for introducing thereinto a combustion mixture including lubricating oil, said intake assembly including an inlet port and a valve member movable relative to said inlet port for admitting the combustion mixture into said crankcase when the pressure in said crankcase is less than the exterior pressure and for preventing back flow of fluid through said inlet port when the pressure in said crankcase is greater than the exterior pressure,
a sump in the bottom of said crankcase for collecting lubricating oil separating from the combustion mixture,
an elongated, axial groove which is formed in said crankshaft, which extends into said gearbox and which periodically communicates with said sump during rotation of said crankshaft only during a period of positive pressure in said crankcase so that the lubricating oil flows from said sump into said gearbox, and
return flow passage means communicating with said gearbox and said intake assembly upstream of said valve member for returning oil from said gearbox to said intake assembly, said return flow passage means including an inlet position above the bottom of said gearcase so that a predetermined level of lubricating oil is maintained in said gearbox.

8. An engine according to claim 7 wherein said return flow passage means includes an outlet located in the top portion of said intake assembly so that the returning lubricating oil flows downwardly into the incoming stream of combustion mixture.

9. An engine according to claim 7 wherein said return passage means includes an outlet located immediately upstream of said valve member so as to expose said return flow passage means to the reduced pressure occuring during travel of said piston toward the top dead center position.

* * * * *

PO-1050
(5/69)

UNITED STATES PATENT OFFICE
CERTIFICATE OF CORRECTION

Patent No. 3,765,393                    Dated    October 16, 1973

Inventor(s)  Wesley C. Pipes

It is certified that error appears in the above-identified patent and that said Letters Patent are hereby corrected as shown below:

| | |
|---|---|
| Column 1, line 26 | delete "separatiang" insert --- separating --- |
| Column 4, line 10 | after "crankcase", delete the comma |
| Column 4, line 16 | delete "gearbox", insert --- gearcase --- |
| Column 4, line 54 | delete "gearbox", insert --- gearcase --- |
| Column 5, line 3 | after "crankcase", delete the comma |
| Column 5, line 4 | before "gear-", insert --- a --- |
| Column 5, line 8 | delete "gearbox", insert --- gearcase --- |
| Column 5, line 9 | delete "gearbox", insert --- gearcase --- |
| Column 5, line 11 | delete "gearbox", insert --- gearcase --- |
| Column 6, line 4 | delete "gearbox", insert --- gearcase --- |

PO-1050
(5/69)

UNITED STATES PATENT OFFICE
CERTIFICATE OF CORRECTION

Patent No. 3,765,393                   Dated October 16, 1973

Inventor(s) Wesley C. Pipes

It is certified that error appears in the above-identified patent and that said Letters Patent are hereby corrected as shown below:

Page 2 (continued)

| | |
|---|---|
| Column 6, line 9 | delete "gearbox", insert --- gearcase --- |
| Column 6, line 11 | delete "gearbox", insert --- gearcase --- |
| Column 6, line 12 | delete "gearbox", insert --- gearcase --- |
| Column 6, line 14 | delete "position" insert --- positioned --- |
| Column 6, line 16 | delete "gearbox", insert --- gearcase --- |

On the cover sheet "9 Claims" should read -- 14 Claims. --

UNITED STATES PATENT OFFICE

CERTIFICATE OF CORRECTION

Patent No. 3,765,393      Dated October 16, 1973

Inventor(s) Wesley C. Pipes

It is certified that error appears in the above-identified patent and that said Letters Patent are hereby corrected as shown below:

Page 3 (continued)

ADD the following claims:

10. A two-cycle engine comprising an engine block including a cylinder, a crankcase assembly including a crankcase periodically communicable with said cylinder and a gearcase, a crankshaft journaled in said crankcase assembly and extending through said crankcase and said gearcase, said crankshaft having a first gear means positioned in said gearcase, an output shaft journaled in said crankcase assembly and extending through said gearcase, said output shaft having a second gear means positioned in said gearcase and meshing with said first gear means, a piston pivotally connected to said crankshaft and reciprocably movable axially within said cylinder between top dead center and bottom dead center positions to periodically pressurize said gearcase, means associated with said crankcase for introducing thereinto

UNITED STATES PATENT OFFICE
CERTIFICATE OF CORRECTION

PO-1050 (5/69)

Patent No. 3,765,393  Dated October 16, 1973

Inventor(s) Wesley C. Pipes

It is certified that error appears in the above-identified patent and that said Letters Patent are hereby corrected as shown below:

Page 4 (continued)

a combustion mixture including lubricating oil when the pressure in said crankcase is less than the exterior pressure and for preventing back flow of fluid from said crankcase when the pressure in said crankcase is greater than the exterior pressure, a sump in the bottom portion of said crankcase for collecting lubricating oil separating from said combustion mixture, and valve means periodically communicating said sump with said gearcase only during a period of positive pressure in said crankcase so that the lubricating oil flows from said sump into said gearcase.

11. An engine according to Claim 10 wherein said valve means is an elongated, axial groove which is formed in said crankshaft, which extends into said gearcase and which periodically communicates with said sump during rotation of said crankshaft.

UNITED STATES PATENT OFFICE
CERTIFICATE OF CORRECTION

PO-1050 (5/69)

Patent No. 3,765,393      Dated October 16, 1973

Inventor(s) Wesley C. Pipes

It is certified that error appears in the above-identified patent and that said Letters Patent are hereby corrected as shown below:

Page 5 (continued)

12. An engine according to Claim 10 including return flow passage means communicating with said gearcase and with said combustion mixture introducing means at a point upstream of said crankcase for returning oil from said gearcase to said combustion mixture introducing means.

13. An engine according to Claim 12 wherein said return flow passage means includes an inlet positioned above the bottom of said gearcase so that a predetermined level of lubricating oil is maintained in said gearcase.

14. An engine according to Claim 12 wherein said return passage means includes an outlet located immediately upstream of said crankcase so as to expose said return flow passage means to the reduced pressure occurring during travel of said piston toward the top dead center position.

Signed and sealed this 27th day of August 1974.

(SEAL)
Attest:

McCOY M. GIBSON, JR.
Attesting Officer

C. MARSHALL DANN
Commissioneroof Patents